July 30, 1929.　　　G. W. COUTTS　　　1,722,561
SELF ADJUSTING BEARING SCREW
Filed Aug. 20, 1923
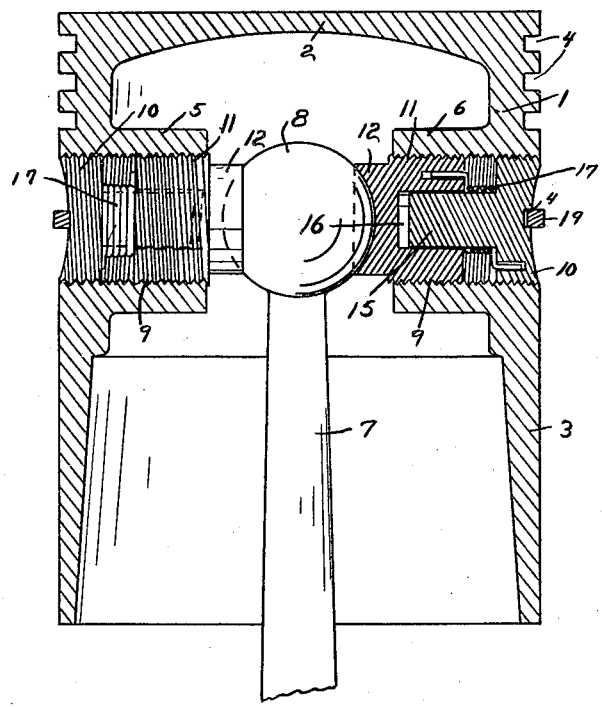

Patented July 30, 1929.

1,722,561

UNITED STATES PATENT OFFICE.

GEORGE W. COUTTS, OF WAUKESHA, WISCONSIN.

SELF-ADJUSTING BEARING SCREW.

Application filed August 20, 1923. Serial No. 658,439.

This invention relates to improvements in self-adjusting bearing screws.

It is the object of this invention to provide a two-part screw having a resiliently flexible connecting member and means for locking one part of the screw, whereby the flexion of said connecting member will be transmitted to the free part of the screw to rotate it in a direction to take up wear.

More particularly, it is my object to provide a screw having the automatic take-up feature above referred to and adapted for use for special purposes which will be more fully described hereinafter. As exemplifying such purposes I make reference to the piston and connecting rod bearing disclosed herein and claimed in my companion application Serial Number 535,073, filed February 8, 1922. I am aware of the fact that Patent Number 1,342,319 issued to John A. Anderson on June 1, 1920 discloses a pair of nuts connected by a helical spring and arranged to take up wear in a bearing and therefore I do not claim broadly a device for that purpose. As above stated, it is one object of this invention to adapt a self-adjusting device for new uses and purposes hereinafter to be specified.

It is a further object of this invention to provide means for supporting one portion of a two-part bearing screw from another portion thereof, thereby obviating the possibility of excessive friction being produced in the threads, and, furthermore, providing support for a helical spring under tension connecting said portions.

It is a further object of this invention to provide a novel, easily machined, and cheaply constructed screw device wholly receivable within a suitably threaded cylindrical aperture.

The drawing shows a piston in axial section exposing a connecting rod and taken in the plane of a transverse connecting rod bearing.

The piston 1, except as hereinafter noted, represents a piston of ordinary construction having a head portion 2, a skirt portion 3 and peripheral grooves 4 for suitable packing rings.

Internally the piston is provided with diametrically opposite bosses 5 and 6 which are provided with aligned screw threaded cylindrical apertures. As shown, such apertures preferably provide a cylindrical opening extending through the piston from one side to the other thereof, as it is very desirable to arrange for the insertion of connecting rod bearing screws from the exterior.

The connecting rod 7 is provided with a spherically surfaced bearing head 8 which is adapted to be engaged between bearing screws threaded in the oppositely disposed apertures of bosses 5 and 6. Such screws constitute the particular subject matter of this application.

Each bearing screw is designated in its entirety by the reference character 9. It includes a lockable portion 10 and an adjustable portion 11. Each of said portions is cylindrical and is externally threaded to fit the threaded apertures in bosses 5 and 6. The adjustable screw portion 11 carries a socketed bearing member 12 which is surfaced for operative engagement with the bearing head 8 as illustrated. The bearing member 12 is preferably integral with screw portion 11 and is no greater in diameter than such portion. It is thus adapted for insertion as a unit from the exterior of the piston.

The screw portion 10 is preferably provided with an axially projecting stud 15 which is receivable with a reasonably close fit into a correspondingly formed recess 16 in screw portion 11. It is the primary function of stud 15 to support the helical spring 17 under strain but said stud will obviously provide a relatively extended bearing surface such as will tend to maintain the portions 10 and 11 of screw 9 in alignment. The spring 17 constantly exerts a force tending to destroy such alignment but the stud counter-acts this tendency and thereby facilitates the automatic adjustment of screw portion 11. The adjustment might be interfered with seriously if it were possible for the spring to so warp portion 11 of the screw as to bring about a binding or cramping of said portion in the threads of its recess.

If, however, the stud 15 and aperture 16 are provided, the axial extent of screw portion 11 can be very much reduced without such cramping effects being apparent. It is immaterial which portion of the screw carries the stud and which has the recess.

The helical spring 17 is coiled upon stud 15 and is engaged at its ends with the screw portions 10 and 11. Engagement may conveniently be effected between these parts by bending the extremities of the spring to parallelism with the axis thereof and providing suitable holes in screw portions 10 and 11 as shown.

In order to be successfully operable, the screw 9 should be provided with some means for securing its portion 10 against rotation. Such means may conveniently take the form illustrated. The lockable portion 10 may be provided with a transverse slot in which a piston ring 19, in one of the grooves 4 of the piston, may be engaged.

In operation, the entire screw 9 is assembled as shown and is threaded into the aperture in one of bosses 5 or 6 until bearing member 12 contacts with the bearing head 8. Thereafter, the continued rotation of screw portion 10 will result in subjecting spring 17 to torsion to a degree determined by the extent of relative movement between the portions 10 and 11 of the screw. Any desired degree of torsion may be maintained by engagement of the piston ring 19 with the slot in the face of screw portion 10.

The stud 15 serves to support the spring and keep it from becoming distorted under torsion. As above pointed out, the stud has the further function of keeping screw portions 10 and 11 in alignment so that even though the length of portion 11 may be relatively short, there will be no tendency for it to bind in its seat.

If the bearing between member 12 and head 8 tends to become worn or otherwise loosened, the torsion of spring 17 exerted on screw portion 9 will turn up such portion, thereby keeping the bearing under predetermined pressure.

Due to the fact that the spring 17 acts through a screw, it is able to exert a much greater pressure upon the bearing than could be exerted by a compression spring of like strength. Furthermore the device is irreversible since no amount of axially directed pressure at the bearing can force the screw portion 11 to act against the torsion of the spring.

It will be understood that the disclosure herein is to be taken as exemplifying my invention and I do not desire to limit myself to the precise construction illustrated except as set forth in the following claims:

I claim:

1. A self-adjusting bearing screw including a pair of externally screw threaded members adapted to be threadedly engaged with a support, one of said members being provided with a bearing surface, the other member being adjustable and adapted to be secured against rotation, and resilient torsionally yieldable means connecting said members.

2. The combination with an externally threaded screw provided with a cylindrical recess, of a rotatably adjustable member provided with a stud adapted for bearing in said recess, and a torsion spring connecting said screw with said member.

3. The combination with an externally threaded screw provided with a bearing surface formed at one end and provided with a bearing recess in its other end, of a rotatably adjustable member provided with a stud adapted for bearing in said recess, and a torsion spring connected at its ends with said screw and said member respectively.

4. A self adjusting bearing externally threaded screw including a screw portion having a recess in one end, a second screw portion having a stud complementary to said recess, said second screw portion being lockable in a plurality of positions of rotative adjustment, and a torsion spring supported upon said stud and connected respectively with each of said screw portions.

5. The combination with an externally screw-threaded member provided with a bearing surface formed in one end and with a recess in its other end, of a rotatably adjustable externally screw-threaded member provided with a stud complementary to said recess, and a helical spring wound about said stud and connected at its ends respectively with each of said members.

6. A self adjusting bearing screw including a pair of externally screw-threaded members of like diameter, one of said members being formed with an axially projecting stud and the other of said members being formed with a complementary recess, whereby said members are maintained in axial alignment, a spring wound upon said stud and connected at its ends with said members, and a bearing surface formed upon one of said members within the diameter thereof.

7. The combination with an externally threaded screw provided with a cylindrical recess, of a second externally threaded screw provided with a stud complementary to said recess and adapted for bearing therein, a torsion spring connecting said first mentioned screw with said second screw, and a bearing surface formed upon the end of one of said screws.

8. The combination with an externally threaded screw provided with a cylindrical recess, of a second externally threaded screw provided with a stud complementary to said recess and adapted for bearing therein, a torsion spring connecting said first mentioned screw with said second screw, and a bearing surface formed upon the end of one of said screws, said bearing surface being formed within the diameter of said last mentioned screw.

9. A self-adjusting bearing screw comprising a pair of externally threaded members of like diameter, one of said members being provided with an axially projecting smoothly finished stud and the other of said members providing a complementary bearing recess adapted to receive and guide said stud, whereby to maintain said screws in operative axial alignment, a torsion spring wound upon said stud and connected at its ends with said members, and a bearing surface formed upon one of said members within the diameter thereof.

10. The combination with a piston having diametrically opposite threaded openings, a pair of externally screw threaded members mounted in each opening, one of said members having a bearing for a connecting rod, the other member being adjustable and adapted to be secured against rotation, and torsionally yieldable means connecting said members for yieldingly urging said first mentioned member into engagement with said connecting rod.

GEORGE W. COUTTS.